Oct. 10, 1933. M. BRANDT Re. 18,967

WATER PURIFICATION

Original Filed March 29, 1926 2 Sheets-Sheet 1

Inventor:
Millard Brandt,
By Cromwell, French & Warden Attys.

Oct. 10, 1933. M. BRANDT Re. 18,967

WATER PURIFICATION

Original Filed March 29, 1926 2 Sheets-Sheet 2

Inventor:
Millard Brandt,
By Cromwell, Frost & Warden Attys

Reissued Oct. 10, 1933

Re. 18,967

UNITED STATES PATENT OFFICE 18,967

WATER PURIFICATION

Millard Brandt, Tamaqua, Pa., assignor to Darco Corporation, Wilmington, Del., a corporation of Delaware Original No. 1,781,314, dated November 11, 1930, Serial No. 96,385, March 29, 1926. Application for reissue September 13, 1932. Serial No. 633,007

5 Claims. (Cl. 210—62)

My invention relates to the art of purifying water, and it has particular reference to a method of and apparatus for purifying water with the aid of activated carbon.

Water purification, or the removal from natural waters of various impurities harmful to health, is now recognized as a civic necessity. In many instances, purification is effected by filtering the water through a bed of sand, by treating with chlorine, or like methods. It has also been proposed to purify water by means of activated carbonaceous material, but such proposals, while particularly desirable, have not been received with favor, due to the mechanical difficulties encountered.

It is the object of this invention to provide means for the purification of water with activated carbon in a metal container without the attendant disadvantages which heretofore prevented the successful accomplishment of such an operation.

This object is realized by filtering water through a bed of activated carbon, which, it has been found by exhaustive experiments and observations, is highly effective in removing color, odor, taste, bacteria, and other impurities from water which render it unfit, in its natural condition, for domestic or industrial use. It is much more effective for this purpose than any other form of carbon. Such carbon, however, being a good conductor of electricity and electro-negative to most metals, in the presence of water forms a galvanic couple with metals, developing electric currents which cause rapid corrosion or disintegration of metals and untimely failure of the installation. To overcome this difficulty, I maintain the carbon out of contact with the metal walls of the container and preferably space the filtering bed of activated carbon from accessory metal elements by means of something other than metal. This removes the major difficulty which has heretofore prevented the exploitation of filters of this character.

I find it best to use as a purifying material firm coarse grains of activated carbon about 85 per cent of which will be retained on a 100 mesh sieve, Bureau of Standards specifications. Other grain sizes may be employed, if desired, but the specification given provides a filtering material through which water may rapidly percolate, while, however, contacting for a sufficient time and with sufficient contact area to insure the proper removal of impurities. As stated, this bed of carbon in the present invention does not contact with the metal walls of the container or with accessory metal elements to cause galvanic actions. To relieve the purifying material from extra duty, I usually provide beds of filtering sand at opposite sides, which not only remove some dirt, color, etc., but also facilitate the spacing of the activated carbon in practical installations.

As compared with other forms of amorphous carbon, activated carbon is a good conductor for the electrical current. Most commercial activated carbons are excellent conductors. Those coarse grades of activated carbon which I have so far prepared for the present apparatus share this property. Where the activated carbon is charged directly into a metal container composed of, for example, iron or steel, and water is passed through the carbon, the metal container is rapidly disintegrated. Also, the activated carbon is contaminated, probably with oxidation products of the metal container, and the special activity of the carbon for the purpose of purifying water is materially lessened. In addition to the contamination of the carbon, it is possible that the loss of activity is at least in part due to the removal of adsorbed oxygen. Apparently where the carbon is in conductive relation to the metal walls of the container, hydrogen is evolved by reason of an electrolytic reaction and acts as a depolarizer keeping the carbon stripped of adsorbed oxygen. Even in the case of filtration of non-oxygen-containing aqueous liquids, such as deep well water through activated carbon contained in a metal filter, disintegration of the metal container and contamination of the water occur. In addition to these disadvantages, if the metal container is not separated from the carbon by an insulating material, the filtrate is contaminated in an undesirable manner.

In accordance with my invention the activated carbon is maintained isolated or separated from metallic conductors with which it can form a galvanic couple. In commercial use metallic containers are highly advantageous, due to their resistance to the pressure under which the filter is desirably operated. The iron or steel or other metallic containers which are used in accordance with my invention are interiorly insulated with a water-proof, permanent dielectric, such as rubber, bakelite or other phenol condensation products, or a good grade of enamel.

In the accompanying drawings, illustrating typical installations of filter apparatus incorporating the principles of my invention, Fig. 1 shows in elevation what may be termed a bucket type filter;

Figure 1:
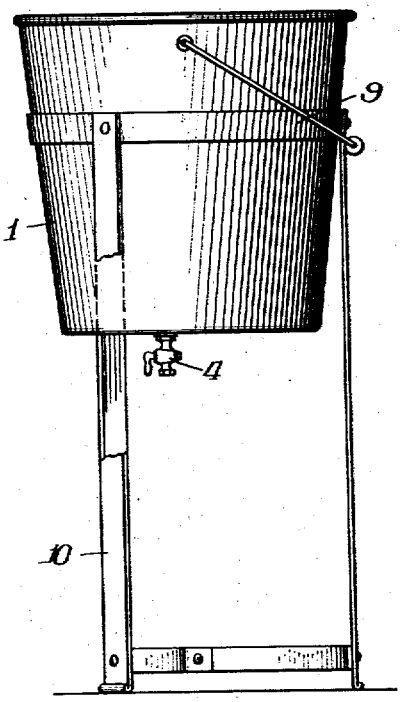
Figure 3:
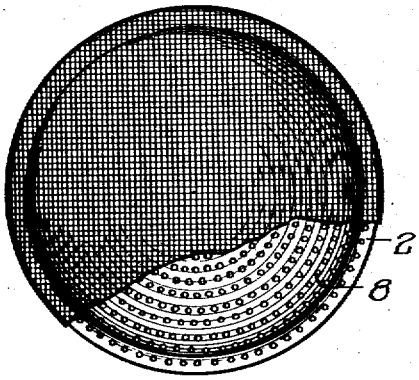
Fig. 3 is a broken away view of the bottom of the filter shown in Fig. 1.
Figure 2:
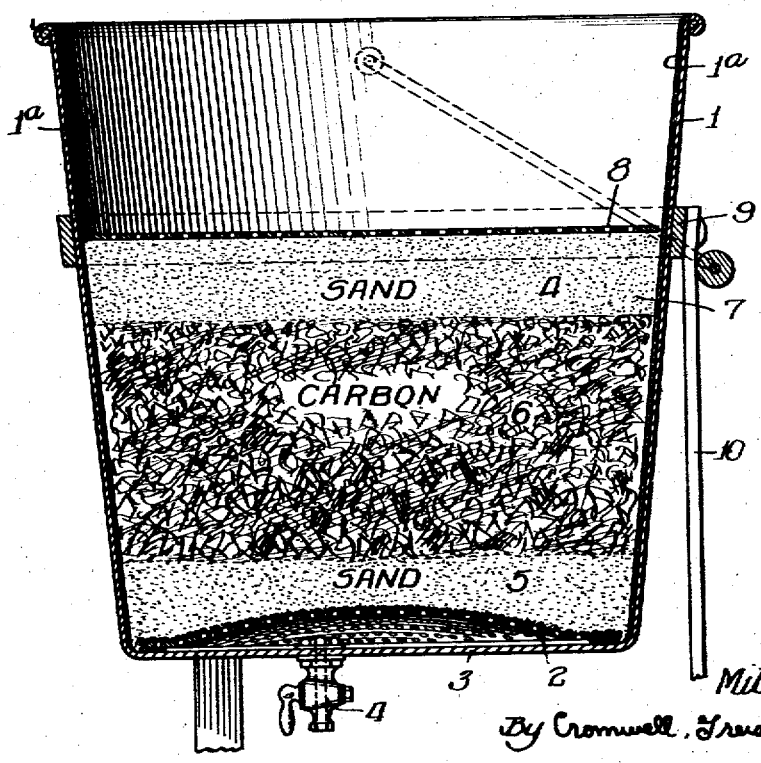
Fig. 2 is a vertical section of the filter shown in Fig. 1.

In the construction illustrated in Figs. 1, 2 and 3, the container for the activated carbon is a metal bucket or pail-like structure 1, which may be of either enameled iron or other type of metal bucket having a lining or coating 1[a] of an insulating material such as bakelite, rubber or enamel. In a modification which has proven satisfactory in practice, ordinary enameled iron is employed as the container. The bucket or container 1 is open at its top and depends upon gravity for percolation of the water through the filter medium. At the base of the container is a perforated supporting means or false bottom 2 which acts to support the filter bed above the bottom 3. The bottom is provided with a valved outlet 4 through which the filtrate is drawn for consumption. Within the container and positioned on the perforated supporting means 2 is a bottom layer 5 of sand. Above the sand is provided a layer or strata 6 of coarse grain activated carbon. It will be seen that the carbon completely fills a horizontal section of the container, the insulating coating 1[a] determining the peripheral limits of the activated carbon bed and separating the same from the metal walls of the container. An upper layer 7 of sand is positioned above the bed of carbon and is maintained in position by a perforated diaphragm 8 of any convenient material. As the sand layers 5 and 7 insulate the activated carbon bed from the support 2 and the perforated diaphragm 8, respectively, the nature of these latter elements is immaterial for present purposes. The structure is provided with a bail 9 and a supporting framework 10.

Figure 4:
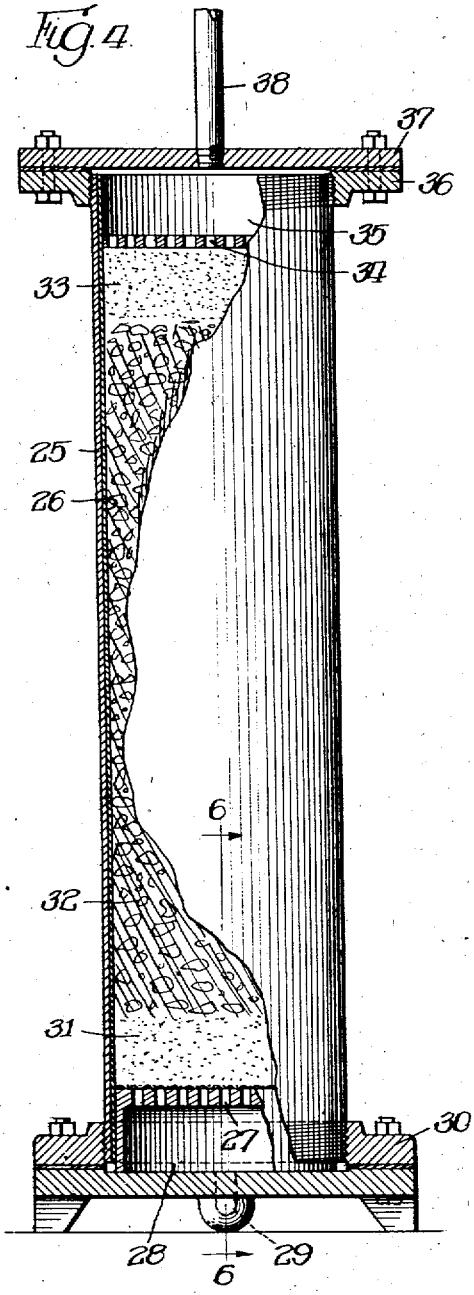
Fig. 4 is a vertical section of a pressure type filter made of metal.
Figure 5:
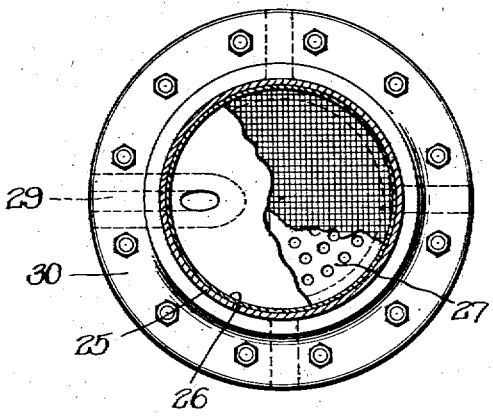
Fig. 5 is a top plan view, partly in section, of the filter shown in Fig. 4.
Figure 6:
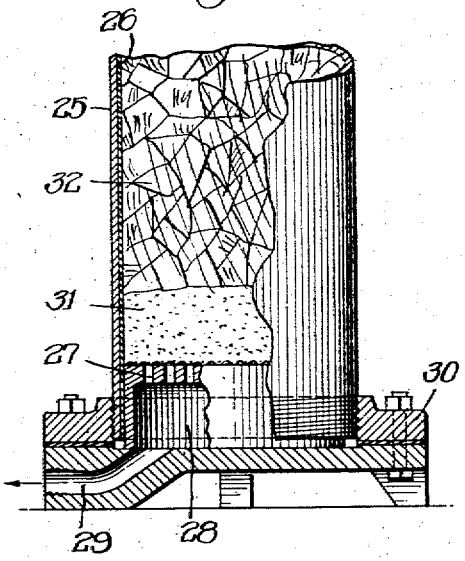
Fig. 6 is a fragmentary view, partly in section, showing in detail the lower portion of the filter shown in Fig. 4 and taking it at right angles to the view in Fig. 4.

The modification shown in Figs. 1, 2 and 3 is intended for field and household use where a large volume and rapid rate of flow are not essential factors. In Figs. 4, 5 and 6 is illustrated a filter apparatus of larger type which is adapted for use in connection with a pressure system. This latter modification comprises a cylindrical container 25 which is preferably made of iron, steel or other metal which will withstand the pressure of the water. The inner side of the metal container is coated or lined with a layer 26 of bakelite, hard rubber or other material withstanding long contact with water and of insulating properties. Within the container 25 is a perforated supporting member or false bottom 27, below which is a water chamber 28 and an outlet conduit 29. The metal container screws into a bottom casting 30 which serves as a support for the whole apparatus. Above the perforated support 27 is a layer of sand or gravel 31. An upper layer 33 of sand is placed above the activated carbon bed and if desirable held in place by an upper perforated diaphragm or grating 34. A water chamber 35 is provided above the grating 35. A flange 36 is screwed to the top of the metal container and a cover 37 is secured to the flange by means of suitable bolts or other fastening devices. Water is introduced into the filter from the pressure line 38 which communicates with the top 37.

The activated carbon completely fills a relatively deep horizontal strata within the metal container and forms a pervious bed which constitutes the path of flow for water passing through the filter. The lining 26 of insulating material forms the peripheral limits of the activated carbon bed and separates the carbon from the metal container. As shown in the drawings, the insulating material extends a substantial distance above and below the upper and lower surfaces, respectively, of the carbon bed, thereby insuring against the formation of an electrolytic current between the bed of carbon and the metal of the container above and below the carbon.

By separating the carbon from the metal container, disintegration of the metal by activated carbon and the aqueous medium, whatever be the nature of the chemical reaction involved in such disintegration, is prevented and the container is suitable for almost unlimited service in supporting the activated carbon.

The various modifications coming within the spirit of my invention are intended to be included in the appended claims.

I claim:

1. In an apparatus for the purification of water with activated carbon, a metal container, a pervious bed of electrically conductive activated carbon disposed in said metal container, and an electrically insulating material in said metal container and separating said bed of activated carbon from said metal container, thereby preventing the activated carbon from forming a galvanic couple with the metal of the container, whereby disintegration of the metal container, and contamination of the activated carbon and water are prevented.

2. In an apparatus for the purification of water with activated carbon, a metal container, a pervious bed of electrically conductive, oxygen-adsorbing activated carbon disposed in said container, and an electrically insulating material in said metal container and separating said bed of activated carbon from said metal container, thereby preventing the carbon from forming a galvanic couple with oxidizable metals when the apparatus is in use and thus to make oxygen adsorbed by the carbon available for reaction with impurities in the water.

3. In an apparatus for the purification of water, a metal container having a coating of an insulating material on its inner side, and a pervious bed of activated carbon disposed in said container and forming the path of flow of water passing therethrough, said insulating material forming the peripheral limit of said bed and separating said activated carbon from the metal container.

4. In an apparatus for the purification of water, a metal container, a pervious bed of activated carbon occupying a section of said container, an insulating material forming the peripheral limits of said bed and spacing the same out of contact with the metal container, a perforated supporting means for said bed, and a layer of sand between said supporting means and said bed of activated carbon.

5. In an apparatus for the purification of water, a metal container having inlet and outlet conduits communicating therewith, a pervious bed of activated carbon in said container and forming the path of flow for the water passing through said apparatus, and an insulating material supporting the activated carbon out of contact with the metal container, said insulating material extending beyond the surface limits of said bed a sufficient distance to prevent the passage of an electrolytic current between said activated carbon and the metal of the container.

MILLARD BRANDT.